United States Patent
Urata et al.

(10) Patent No.: US 10,193,183 B2
(45) Date of Patent: Jan. 29, 2019

(54) NONAQUEOUS ELECTROLYTE SECONDARY BATTERIES

(71) Applicant: SANYO Electric Co., Ltd., Daito-shi, Osaka (JP)

(72) Inventors: Sho Urata, Hyogo (JP); Kaoru Nagata, Osaka (JP); Manabu Takijiri, Osaka (JP); Rie Matsuoka, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 154 days.

(21) Appl. No.: 15/119,936

(22) PCT Filed: Feb. 13, 2015

(86) PCT No.: PCT/JP2015/000657
§ 371 (c)(1),
(2) Date: Aug. 18, 2016

(87) PCT Pub. No.: WO2015/129188
PCT Pub. Date: Sep. 3, 2015

(65) Prior Publication Data
US 2017/0062871 A1 Mar. 2, 2017

(30) Foreign Application Priority Data
Feb. 28, 2014 (JP) ................. 2014-037871

(51) Int. Cl.
| | | |
|---|---|---|
| H01M 10/0567 | (2010.01) | |
| H01M 4/131 | (2010.01) | |
| H01M 4/133 | (2010.01) | |
| H01M 4/505 | (2010.01) | |
| H01M 4/525 | (2010.01) | |
| H01M 10/0525 | (2010.01) | |
| H01M 4/36 | (2006.01) | |
| H01M 4/485 | (2010.01) | |
| H01M 4/134 | (2010.01) | |
| H01M 4/02 | (2006.01) | |

(52) U.S. Cl.
CPC ....... *H01M 10/0525* (2013.01); *H01M 4/131* (2013.01); *H01M 4/133* (2013.01); *H01M 4/366* (2013.01); *H01M 4/485* (2013.01); *H01M 4/505* (2013.01); *H01M 4/525* (2013.01); *H01M 10/0567* (2013.01); *H01M 4/134* (2013.01); *H01M 2004/027* (2013.01); *Y02T 10/7011* (2013.01)

(58) Field of Classification Search
CPC ...... H01M 4/131; H01M 4/133; H01M 4/505; H01M 4/525; H01M 10/0525; H01M 10/0567; H01M 4/366; H01M 4/485; H01M 4/134; H01M 2004/027; Y02T 10/7011
See application file for complete search history.

(56) References Cited

U.S. PATENT DOCUMENTS

| | | | |
|---|---|---|---|
| 2003/0162093 A1* | 8/2003 | Hossain | H01M 2/1653 429/231.8 |
| 2009/0311599 A1 | 12/2009 | Kawai et al. | |
| 2012/0034516 A1* | 2/2012 | Koo | C01G 45/1228 429/200 |
| 2012/0288742 A1 | 11/2012 | Tanaka et al. | |
| 2013/0273439 A1 | 10/2013 | Tanaka et al. | |
| 2014/0356723 A1* | 12/2014 | Suehiro | H01M 4/131 429/231.4 |
| 2015/0021518 A1* | 1/2015 | Kokado | H01M 4/525 252/182.1 |

FOREIGN PATENT DOCUMENTS

| | | |
|---|---|---|
| CN | 103918107 A | 7/2014 |
| CN | 103988349 A | 8/2014 |
| JP | 5-258773 A | 10/1993 |
| JP | 6-349524 A | 12/1994 |
| JP | 7-192723 A | 7/1995 |
| JP | 11-224699 A | 8/1999 |
| JP | 2005-519426 A | 6/2005 |
| JP | 2009-4304 A | 1/2009 |
| JP | 2011-60605 A | 3/2011 |
| JP | 2012-508444 A | 4/2012 |
| JP | 2012-94498 A | 5/2012 |
| JP | 2013-171785 A | 9/2013 |
| WO | 2012/036127 A1 | 3/2012 |
| WO | 2013/099278 A1 | 7/2013 |

OTHER PUBLICATIONS

International Search Report dated May 19, 2015, issued in counterpart International Application No. PCT/JP2015/000657 (2 pages).
English translation of Chinese Search Report dated Feburay 24, 2018, issued in counterpart Chinese Application No. 2015800110324. (3 pages).

* cited by examiner (Continued)

*Primary Examiner* — Muhammad S Siddiquee
(74) *Attorney, Agent, or Firm* — Westerman, Hattori, Daniels & Adrian, LLP (57) ABSTRACT

The invention provides nonaqueous electrolyte secondary batteries having excellent output characteristics during large-current charging and discharging. A nonaqueous electrolyte secondary battery according to one aspect of the invention includes a positive electrode including a lithium transition metal oxide, a negative electrode including a negative electrode active material capable of storing and releasing lithium ions, and a nonaqueous electrolyte, the negative electrode active material including a carbon material as a main component, the negative electrode including a tungsten compound and/or a molybdenum compound. The tungsten compound and/or the molybdenum compound is preferably attached to the surface of the carbon material.

14 Claims, 2 Drawing Sheets

NONAQUEOUS ELECTROLYTE SECONDARY BATTERIES

TECHNICAL FIELD

The present invention relates to nonaqueous electrolyte secondary batteries.

BACKGROUND ART

With the recent accelerated reduction in the size and weight of mobile information terminals such as cellphones, laptop computers and smartphones, there is a demand for higher capacities of batteries that power such devices. Nonaqueous electrolyte secondary batteries, which are charged and discharged by the movement of lithium ions between positive and negative electrodes, have a high energy density and a high capacity and are widely used as power supplies for driving the above mobile information terminals.

Further, nonaqueous electrolyte secondary batteries recently attract attention as power supplies for powering electric tools, electric vehicles and the like, and are expected to find a wider range of applications. Such power supplies are required to have a high capacity for long use and also to have high output characteristics.

To attain an enhancement in output characteristics, Patent Literature 1 suggests to use, as a negative electrode active material, a mixture of graphite particles obtained by impregnating and coating natural graphite with a pitch-carbon black mixture followed by calcination, and carbonaceous particles obtained by calcining a pitch-carbon black mixture.

Patent Literature 2 discloses that output characteristics at low temperatures are enhanced by using a negative electrode material which includes a carbon material capable of storing and releasing lithium ions and a compound having a Group 13 element in the periodic table.

CITATION LIST

Patent Literature

PTL 1: Japanese Published Unexamined Patent Application No. 2009-04304
PTL 2: Japanese Published Unexamined Patent Application No. 2012-94498

SUMMARY OF INVENTION

Technical Problem

However, even the techniques disclosed in Patent Literatures 1 and 2 only attain insufficient enhancements in output characteristics. Further improvements in characteristics are thus demanded.

Solution to Problem

To solve the problems discussed above, an aspect of the invention resides in a nonaqueous electrolyte secondary battery which includes a positive electrode including a lithium transition metal oxide, a negative electrode including a negative electrode active material capable of storing and releasing lithium ions, and a nonaqueous electrolyte, the negative electrode active material including a carbon material as a main component, the negative electrode including a tungsten compound and/or a molybdenum compound.

Advantageous Effects of Invention

The nonaqueous electrolyte secondary battery provided according to one aspect of the present invention attains enhanced output characteristics during large-current charging and discharging by virtue of the enhancement in the diffusibility of lithium ions on the surface of the negative electrode active material.

DESCRIPTION OF EMBODIMENTS

Hereinbelow, embodiments of the invention will be described. The embodiments illustrate some examples for carrying out the invention. The scope of the invention is not limited to those embodiments, and appropriate modifications are possible without departing from the spirit of the invention. The figures that are referred to in the explanation of the embodiments are schematic, and therefore the configuration such as sizes of the constituents illustrated in the figures may differ from the actual ones. Specific scales such as sizes should be estimated in consideration of the description given below.

<Nonaqueous Electrolyte Secondary Batteries>

A nonaqueous electrolyte secondary battery according to an embodiment includes a positive electrode including a lithium transition metal oxide, a negative electrode including a negative electrode active material capable of storage and release of lithium ions, and a nonaqueous electrolyte. The negative electrode active material includes a carbon material as a main component. The negative electrode includes a tungsten compound and/or a molybdenum compound. In the nonaqueous electrolyte secondary battery according to the present embodiment, the incorporation of a tungsten compound and/or a molybdenum compound to the negative electrode results in the formation of a quality film having excellent lithium ion diffusibility on the surface of the negative electrode active material. Consequently, the nonaqueous electrolyte secondary battery attains excellent output characteristics during large-current charging and discharging.

In general, the first charging of a nonaqueous electrolyte secondary battery is accompanied by reductive decomposition reactions such as of a nonaqueous electrolytic solution occurring on a negative electrode active material, resulting in the formation of a protective film called a solid electrolyte film on the surface of the negative electrode active material. Lithium ions are exchanged between the negative electrode active material and the electrolytic solution through this protective film. Studies by the present inventors have revealed that such a protective film allows lithium ions to diffuse poorly and have also found that this protective film with poor lithium ion diffusibility covers the surface of the negative electrode active material so excessively during the first charging that the resistance is increased and the output characteristics during large-current charging and discharging are decreased.

By the incorporation of a tungsten compound and/or a molybdenum compound to a negative electrode as is the case in the aforementioned configuration, in contrast, the reductive decomposition reactions during the first charging such as of a nonaqueous electrolytic solution occur first on the tungsten compound and/or the molybdenum compound present in the vicinity of the surface of the negative electrode active material, and the decomposition compounds resulting from such reactions form a quality film having excellent lithium ion diffusibility on the surface of the negative electrode active material. As a result, the diffusibility of lithium ions (the mobility of lithium ions) within the film is enhanced so that lithium ions can be exchanged smoothly between the negative electrode active material and the nonaqueous electrolytic solution during large-current charging and discharging. Further, this early formation of a quality film on the surface of the negative electrode active material prevents the surface of the negative electrode active material from being excessively covered by a protective film with poor lithium ion diffusibility that results from the reductive decomposition reactions such as of the nonaqueous electrolytic solution on the negative electrode active material. This mechanism is probably the reason why the increase in resistance can be suppressed and excellent output characteristics can be obtained.

It is favorable to provide a separator between a positive electrode and a negative electrode. An exemplary structure of the nonaqueous electrolyte secondary batteries is such that the positive electrode and the negative electrode are wound together via a separator and this electrode assembly and the nonaqueous electrolyte are accommodated in an exterior case. This specific configuration of the nonaqueous electrolyte secondary batteries will be described in detail with reference to FIGS. 1 and 2.

Figure 1:
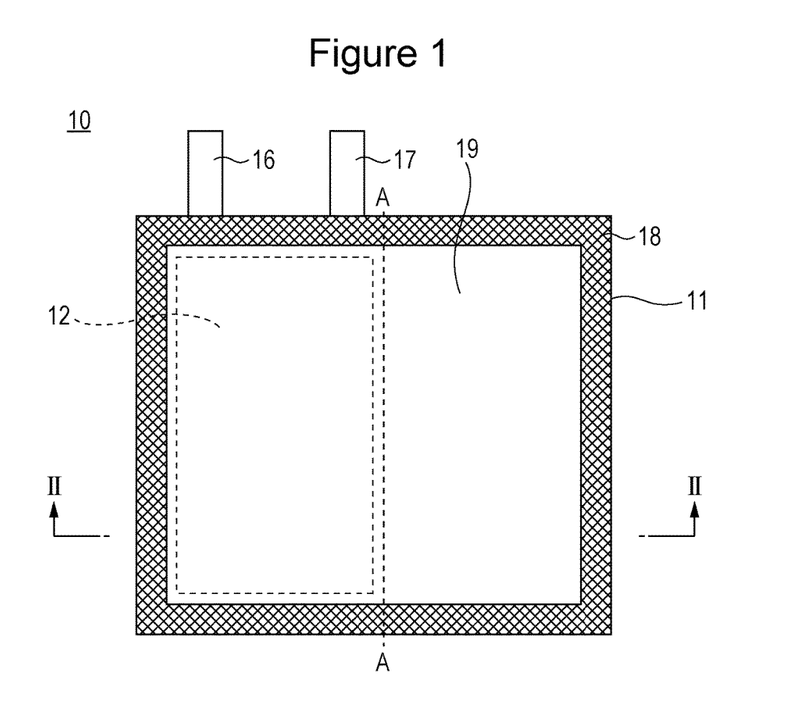
FIG. 1 is a schematic plan view of a nonaqueous electrolyte secondary battery according to an embodiment of the invention.
Figure 2:
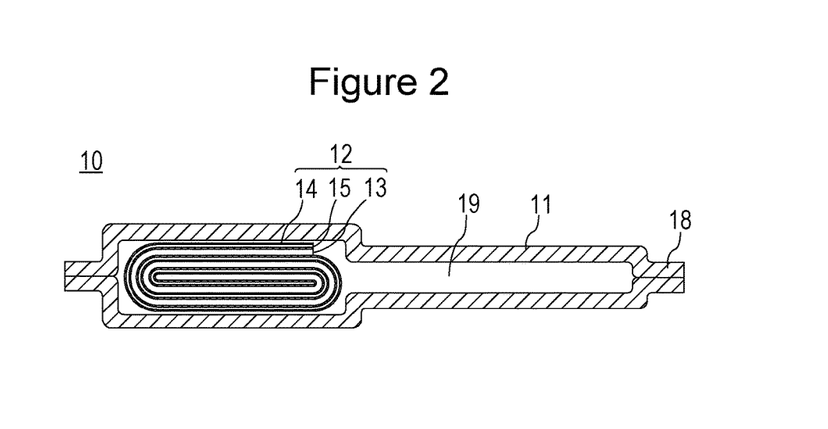
FIG. 2 is a schematic sectional view taken along line II-II of FIG. 1.

A nonaqueous electrolyte secondary battery 10 includes a surrounding laminate exterior case 11, a flat wound electrode assembly 12, and a nonaqueous electrolytic solution as a nonaqueous electrolyte. The wound electrode assembly 12 has a positive electrode 13 and a negative electrode 14 that are wound into a flat coil while being insulated from each other via a separator 15. A positive electrode current collector tab 16 is connected to the positive electrode 13 in the wound electrode assembly 12. Similarly, a negative electrode current collector tab 17 is connected to the negative electrode 14. The wound electrode assembly 12 is enclosed in the surrounding laminate exterior case 11 together with the nonaqueous electrolytic solution. The outer peripheral edge portion of the laminate exterior case 11 is sealed to define a heat-sealed portion 18. In the figures, an extended space 19 is a backup space for minimizing the influence that will be caused on charging and discharging by a gas generated by the decomposition of the components such as the electrolytic solution during preliminary charging of the battery. After preliminary charging, the laminate exterior case 11 is tightly closed by being heat sealed along line A-A and thereafter the extended space 19 is cut off. The structure of the electrode assembly, and the exterior case are not limited to those described above. For example, the structure of the electrode assembly may be a stack type in which positive electrodes and negative electrodes are stacked alternately via separators. The exterior case may be, for example, a metallic battery case having a prismatic shape or the like.

[Negative Electrodes]

Figure 3:
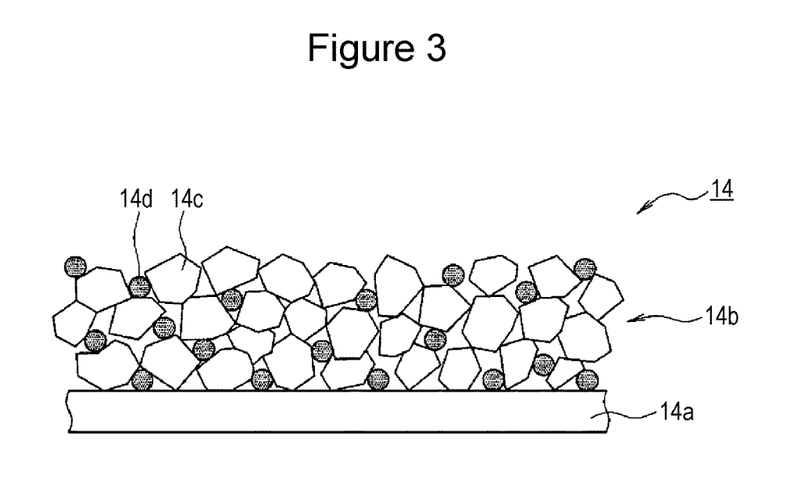
FIG. 3 is a schematic sectional view illustrating a negative electrode according to an embodiment of the invention.

As illustrated in FIG. 3, the negative electrode 14 includes a negative electrode current collector 14a and a negative electrode mixture layer 14b disposed on the negative electrode current collector 14a. The negative electrode current collector 14a is, for example, a conductive thin film, in particular, a metal foil or an alloy foil that is stable at negative electrode potentials such as copper, or a film having a skin layer of a metal such as copper. The negative electrode mixture layer includes a negative electrode active material and preferably further includes a thickener and a binder. Suitable thickeners are, among others, carboxymethyl cellulose, carboxyalkyl cellulose, hydroxyalkyl cellulose and alkoxycellulose. Suitable binders are, among others, styrene-butadiene rubber (SBR) and polyimide.

The main component of the negative electrode active material is a negative electrode active material 14c that is a carbon material. The carbon material is particles including graphite. The negative electrode active material preferably includes the negative electrode active material 14c that is a carbon material, and a negative electrode active material 14d that is a silicon compound. The silicon compound is preferably particles of silicon oxide represented by $SiO_x$ (preferably $0.5 \leq x \leq 1.5$). Preferably, the negative electrode active material 14d is such that a carbon-containing material is applied to the surface thereof to form a carbon film on the surface of the negative electrode active material 14d.

Preferably, the carbon film is mainly composed of amorphous carbon. Amorphous carbon can form a quality uniform film on the surface of the silicon compound to make it possible to further facilitate the diffusion of lithium ions to the silicon compound.

The mass ratio of the negative electrode active material 14c to the negative electrode active material 14d is preferably 99:1 to 70:30, and more preferably 97:3 to 90:10. This mass ratio ensures that output characteristics will be enhanced more effectively. The reason for this is because an excessively high mass ratio of the negative electrode active material 14d leads to a decrease in the discharge voltage of the battery and also results in a decrease in output characteristics.

Although not illustrated in FIG. 3, the negative electrode 14 includes a tungsten compound and/or a molybdenum compound. The tungsten compound and/or the molybdenum compound is preferably contained within the negative electrode mixture layer 14b.

The tungsten compound and/or the molybdenum compound should be present at least in the vicinity of the surface of the negative electrode active material 14c and the negative electrode active material 14d. The presence of the tungsten compound and/or the molybdenum compound near the surface of the negative electrode active material 14c and the negative electrode active material 14d ensures that reductive decomposition reactions such as of the nonaqueous electrolytic solution will occur on the tungsten compound and/or the molybdenum compound and the resultant decomposition products will form a quality film on the surface of the negative electrode active material 14c and the negative electrode active material 14d. This mechanism effectively prevents the aforementioned excessive coverage of the surface of the negative electrode active material and also effectively provides an enhancement in lithium ion diffusibility.

To obtain a further enhancement in the above effects, it is preferable that the tungsten compound and/or the molybdenum compound be attached to the surface of the negative electrode active material 14c and the negative electrode active material 14d. Preferably, the tungsten compound and/or the molybdenum compound is attached to part of the surface of the negative electrode active material 14c and the negative electrode active material 14d. That is, it is preferable that the tungsten compound and/or the molybdenum compound do not cover the entire surface of the negative electrode active material 14c and the negative electrode active material 14d, and portions of the surface be exposed. The reason for this is because although the tungsten compound and/or the molybdenum compound allows lithium ions to permeate therethrough, their lithium ion diffusibility is low as compared to a film of decomposition products formed by reductive decomposition reactions such as of the nonaqueous electrolytic solution on the tungsten compound and/or the molybdenum compound, and consequently the performance is lowered.

The tungsten compound and/or the molybdenum compound attached to the surface of the negative electrode active material may partially form a solid solution with the negative electrode active material, or may be physically attached to the surface of the negative electrode active material without being dissolved in the negative electrode active material. In view of the fact that the aforementioned effects are ascribed to a quality film of products formed by the reductive decomposition reaction of the nonaqueous electrolytic solution on the tungsten compound and/or the molybdenum compound, it is particularly preferable that the tungsten compound and/or the molybdenum compound be physically attached to the surface of the negative electrode active material.

The tungsten compound is not limited as long as the compound contains tungsten, but is preferably at least one selected from tungsten oxides and tungsten lithium composite oxides. Specific examples include $WO_3$, $Li_2WO_4$ and $WO_2$.

The molybdenum compound is not limited as long as the compound contains molybdenum, but is preferably at least one selected from molybdenum oxides and molybdenum lithium composite oxides. Specific examples include $Li_2MoO_4$ and $MoO_3$.

On the surface of the negative electrode active material, there may be a tungsten compound alone, a molybdenum compound alone, or both compounds. In an embodiment, a compound containing both tungsten and molybdenum, namely, a tungsten molybdenum compound may be present on the surface of the negative electrode active material.

The content of the tungsten compound and/or the molybdenum compound, in terms of the tungsten and molybdenum elements present in the negative electrode active material, is preferably not less than 0.001 mol % and not more than 1.0 mol %, and more preferably not less than 0.1 mol % and not more than 1.0 mol % relative to the total molar amount of the negative electrode active material. If the content is less than 0.001 mol %, the advantageous effects of the present invention cannot be fully obtained on account of the decrease in the amount of products formed by the reductive decomposition of the nonaqueous electrolyte on the tungsten compound and/or the molybdenum compound. Regarding the upper limit, on the other hand, any content exceeding 1.0 mol % makes it difficult to obtain the advantageous effects of the invention because the tungsten compound and/or the molybdenum compound having low ion diffusibility will cover an increased area of the surface of the negative electrode active material particles.

The tungsten compound and/or the molybdenum compound may be incorporated to the negative electrode by, for example, admixing the tungsten compound and/or the molybdenum compound with the negative electrode active material during the preparation of a negative electrode mixture slurry, or by impregnating the negative electrode active material with a dispersion of the tungsten compound and/or the molybdenum compound followed by drying.

[Positive Electrodes]

The positive electrode includes a positive electrode current collector and a positive electrode active material layer disposed on the positive electrode current collector. The positive electrode current collector is, for example, a conductive thin film, in particular, a metal foil or an alloy foil that is stable at positive electrode potentials such as aluminum, or a film having a skin layer of a metal such as aluminum. The positive electrode active material layer includes a positive electrode active material and preferably further includes a conductive agent and a binder.

The positive electrode active material includes an oxide containing lithium and a metal element M, and the metal element M includes at least one selected from the group including such metals as cobalt, nickel and manganese. Preferably, the oxide is a lithium transition metal oxide. The lithium transition metal oxide may contain a non-transition metal element such as Mg or Al. Specific examples include lithium cobalt oxide and lithium transition metal oxides of metals such as Ni—Co—Mn, Ni—Mn—Al and Ni—Co—Al. To attain a higher capacity, in particular, lithium transition metal oxide of Ni—Co—Al is preferable. The positive electrode active material may include a single such oxide or a mixture of such oxides.

In the lithium transition metal oxide, the main component of the metal elements is preferably Ni. Here, the main component being Ni means that Ni has the largest proportion (number of moles) in the metal elements present in the lithium transition metal oxide.

The lithium transition metal oxide is preferably an oxide represented by the general formula $Li_aNi_xM_{1-x}O_2$ ($0.95 \leq a \leq 1.2$, $0.8 \leq x < 1$, and M is at least one or more elements selected from Co, Mn and Al).

The reason why the ratio a of Li is limited to $0.95 \leq a \leq 1.2$ is because the satisfaction of $0.95 \leq a \leq 1.2$ reduces the probability that Ni ions will enter Li sites, namely, the occurrence of cation mixing, resulting in an enhancement in output characteristics. The ratio x of Ni is limited to $0.8 \leq x < 1$ because when $0.8 \leq x$, namely, when Ni represents 80% or more of the metal elements present in the lithium transition metal oxide, an increased amount of Ni can contribute to the charging and discharging reactions so that the capacity is increased.

The lithium transition metal oxide is particularly preferably an oxide represented by the general formula $Li_aNi_xCo_yAl_zO_2$ ($0.95 \leq a \leq 1.2$, $0.8 \leq x < 1$, $0 < y < 0.2$, $0 < z \leq 0.05$, and $x+y+z=1$).

The reason why the ratio y of Co is limited to $0 < y < 0.2$ is because when $y < 0.2$, the phase transition of the lithium nickel oxide compound associated with charging and discharging can be prevented while still ensuring a high capacity. Further, the ratio z of Al is limited to $0 < z \leq 0.05$ because the satisfaction of $0 < z \leq 0.05$ leads to an enhancement in the thermal stability of the positive electrode. If, on the other hand, $0.05 < z$, output characteristics are decreased.

The lithium transition metal oxide is preferably in the form of secondary particles formed by the aggregation of primary particles. Preferably, a tungsten compound and/or a molybdenum compound is present on the surface of at least either the primary particles of the lithium transition metal oxide or the secondary particles of the lithium transition metal oxide, and is preferably present on the surface of both the primary particles and the secondary particles. The presence of a tungsten compound and/or a molybdenum compound on the surface of the lithium transition metal oxide provides an enhancement in output characteristics probably because the reaction resistance at the interface between the nonaqueous electrolytic solution and the positive electrode is reduced.

Examples of the tungsten compounds and/or the molybdenum compounds present on the surface of the lithium transition metal oxide include those tungsten compounds and molybdenum compounds described with respect to the negative electrodes hereinabove.

The amount of the tungsten compound and/or the molybdenum compound present on the surface of the lithium transition metal oxide is preferably not less than 0.1 mol % and not more than 1.5 mol % relative to the total molar amount of the metal elements in the lithium transition metal oxide except Li.

The tungsten compound and/or the molybdenum compound may partially form a solid solution with the lithium transition metal oxide, or may be physically attached to the surface of the lithium transition metal oxide without being dissolved in the lithium transition metal oxide. To obtain a higher effect in output characteristics, it is preferable that the tungsten compound and/or the molybdenum compound be physically attached to the surface of the lithium transition metal oxide without being dissolved in the lithium transition metal oxide.

The tungsten compound and/or the molybdenum compound may be caused to be present on the surface of the lithium transition metal oxide by, for example, mixing the lithium transition metal oxide together with the tungsten compound and/or the molybdenum compound during the preparation of a positive electrode mixture slurry, or by mixing the calcined lithium transition metal oxide together with the tungsten compound and/or the molybdenum compound and heat treating the resultant mixture. The latter process is more preferable because the lithium transition metal oxide produced can have the tungsten compound and/or the molybdenum compound on the surface of both the primary particles and the secondary particles.

[Nonaqueous Electrolytes]

The nonaqueous electrolyte includes a nonaqueous solvent and an electrolyte salt dissolved in the nonaqueous solvent. The nonaqueous electrolytes are not limited to liquid electrolytes (nonaqueous electrolytic solutions) and may be solid electrolytes such as gelled polymer electrolytes.

Examples of the nonaqueous solvents include cyclic carbonate esters, chain carbonate esters and cyclic carboxylate esters. Examples of the cyclic carbonate esters include propylene carbonate (PC), ethylene carbonate (EC) and vinylene carbonate (VC). Examples of the chain carbonate esters include diethyl carbonate (DEC), methyl ethyl carbonate (MEC) and dimethyl carbonate (DMC). Examples of the cyclic carboxylate esters include γ-butyrolactone (GBL) and γ-valerolactone (GVL). Examples of the chain carboxylate esters include methyl propionate (MP) and fluoromethyl propionate (FMP). The nonaqueous solvents may be used singly, or two or more may be used in combination.

The nonaqueous solvent preferably includes fluoroethylene carbonate (FEC) that is a cyclic carbonate ester. The reason for this is because FEC contained in the nonaqueous electrolyte is decomposed on the tungsten compound and/or the molybdenum compound during the first charging to form a film with high lithium ion diffusibility on the surface of the negative electrode active material.

The electrolyte salt may be, for example, a lithium salt. The lithium salt may be one including one or more elements selected from the group consisting of P, B, F, O, S N and Cl. Specific examples include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylate, LiCl, LiBr, Lii, chloroborane lithium, borate salts and imide salts. Of these, $LiPF_6$ is preferably used from the points of view of ion conductivity and electrochemical stability. The electrolyte salts may be used singly, or two or more may be used in combination. The electrolyte salt is preferably present with a concentration of 0.8 to 1.5 mol per 1 L of the nonaqueous electrolyte.

[Separators]

For example, the separator is a porous sheet having ion permeability and insulating properties. Specific examples of the porous sheets include microporous thin films, woven fabrics and nonwoven fabrics. Suitable materials of the separators are polyolefins such as polyethylene and polypropylene.

EXAMPLES

Hereinbelow, EXAMPLES of the present invention will be described specifically in greater detail based on EXPERIMENTAL EXAMPLES. However, the scope of the invention is not limited to those EXAMPLES below and appropriate modifications are possible without departing from the spirit of the invention.

First Experimental Examples

Experimental Example 1

[Fabrication of Negative Electrode]

A mixture was prepared by mixing 100 parts by mass of a graphite powder as a negative electrode active material, 1 part by mass of carboxymethyl cellulose (CMC) as a thickener, 1 part by mass of styrene butadiene rubber (SBR) as a binder, and tungsten oxide ($WO_3$) as a negative electrode additive in 0.05 mol % in terms of tungsten atoms in tungsten oxide relative to the carbon atoms in the graphite powder. Further, an appropriate amount of water was added. Thus, a negative electrode mixture slurry was prepared.

Next, the negative electrode mixture slurry was applied to both sides of a 10 μm thick copper foil as a negative electrode current collector, and the coating was dried. The coated foil was cut into a prescribed electrode size and was rolled with a roller. Thereafter, a negative electrode current collector tab was attached to the negative electrode current collector. In this manner, a negative electrode was fabricated which had the negative electrode mixture layers on the negative electrode current collector.

[Fabrication of Positive Electrode]

A mixture was prepared by mixing 100 parts by mass of lithium nickel cobalt aluminum composite oxide $LiNi_{0.82}Co_{0.15}Al_{0.03}O_2$ as a lithium transition metal oxide, 1 part by mass of carbon black as a carbon conductive agent and 0.9 parts by mass of polyvinylidene fluoride as a binder. Further, an appropriate amount of NMP (N-methyl-2-pyrrolidone) was added, thereby forming a positive electrode mixture slurry. Next, the positive electrode mixture slurry was applied to both sides of a 15 μm thick aluminum foil as a positive electrode current collector, and the coating was dried. The coated foil was cut into a prescribed electrode size and was rolled with a roller. Thereafter, a positive electrode current collector tab was attached to the positive electrode current collector. In this manner, a positive electrode was fabricated which had the positive electrode mixture layers on the positive electrode current collector.

[Fabrication of Electrode Assembly]

A flat wound electrode assembly was fabricated using one sheet of the positive electrode, one sheet of the negative electrode, and one sheet of a polyethylene macroporous film as a separator. First, the positive electrode and the negative electrode were opposed to each other while being insulated from each other via the separator. Next, these sheets were wound into a coil on a cylindrical core in such a manner that the positive electrode current collector tab and the negative electrode current collector tab were disposed on the outermost peripheral side of the respective electrodes. The core was pulled out, and the resultant wound electrode assembly was crushed into a flat wound electrode assembly. This flat wound electrode assembly had a structure in which the positive electrode and the negative electrode were stacked via the separator.

[Preparation of Nonaqueous Electrolytic Solution]

Vinylene carbonate (VC) was dissolved in 2 mass % into a mixed solvent including ethylene carbonate (EC), dimethyl carbonate (DMC) and ethyl methyl carbonate (FMC) in a volume ratio of 20:60:20. Further, lithium phosphate hexafluoride ($LiPF_6$) as an electrolyte was dissolved into the mixed solvent so that the concentration thereof would be 1.3 mol/L. A nonaqueous electrolytic solution was thus prepared.

[Fabrication of Battery]

In a glove box under argon atmosphere, the nonaqueous electrolytic solution and the flat wound electrode assembly prepared above were inserted into a laminate exterior case made of aluminum, and a laminate nonaqueous electrolyte secondary battery 10 having a structure illustrated in FIGS. 1 and 2 was fabricated. The nonaqueous electrolyte secondary battery was charged to a battery voltage of 4.2 V, and the design capacity of the battery was 950 mAh.

The battery thus fabricated will be written as the battery A1 hereinbelow.

Experimental Example 2

A nonaqueous electrolyte secondary battery was fabricated in the same manner as in EXPERIMENTAL EXAMPLE 1, except that the tungsten oxide used in the preparation of the negative electrode mixture slurry in EXPERIMENTAL EXAMPLE 1 was not added.

The battery thus fabricated will be written as the battery Z1 hereinbelow.

Experimental Example 3

A nonaqueous electrolyte secondary battery was fabricated in the same manner as in EXPERIMENTAL EXAMPLE 1, except that the amount of tungsten oxide added in the preparation of the negative electrode mixture slurry was changed from 0.05 mol % in EXPERIMENTAL EXAMPLE 1 to 0.1 mol %.

The battery thus fabricated will be written as the battery A2 hereinbelow.

Experimental Example 4

A nonaqueous electrolyte secondary battery was fabricated in the same manner as in EXPERIMENTAL EXAMPLE 1, except that the amount of tungsten oxide added in the preparation of the negative electrode mixture slurry was changed from 0.05 mol % in EXPERIMENTAL EXAMPLE 1 to 0.5 mol %.

The battery thus fabricated will be written as the battery A3 hereinbelow.

Experimental Example 5

A nonaqueous electrolyte secondary battery was fabricated in the same manner as in EXPERIMENTAL EXAMPLE 1, except that the amount of tungsten oxide added in the preparation of the negative electrode mixture slurry was changed from 0.05 mol % in EXPERIMENTAL EXAMPLE 1 to 1.0 mol %.

The battery thus fabricated will be written as the battery A4 hereinbelow.

Experimental Example 6

A nonaqueous electrolyte secondary battery was fabricated in the same manner as in EXPERIMENTAL EXAMPLE 1, except that the tungsten oxide ($WO_3$) used in the preparation of the negative electrode mixture slurry in EXPERIMENTAL EXAMPLE 1 was replaced by lithium tungsten oxide ($Li_2WO_4$), and the lithium tungsten oxide was added in 0.01 mol % in terms of tungsten atoms in lithium tungsten oxide relative to the carbon atoms in the graphite powder.

The battery thus fabricated will be written as the battery A5 hereinbelow.

Experimental Example 7

A nonaqueous electrolyte secondary battery was fabricated in the same manner as in EXPERIMENTAL EXAMPLE 6, except that the amount of lithium tungsten oxide added in the preparation of the negative electrode mixture slurry was changed from 0.01 mol % in EXPERIMENTAL EXAMPLE 6 to 0.05 mol %.

The battery thus fabricated will be written as the battery A6 hereinbelow.

Experimental Example 8

A nonaqueous electrolyte secondary battery was fabricated in the same manner as in EXPERIMENTAL EXAMPLE 1, except that the preparation of the negative electrode mixture slurry involved mixing of 96 parts by mass of a graphite powder as a negative electrode active material, 4 parts by mass of carbon-coated SiO as a negative electrode active material, 1 part by mass of carboxymethyl cellulose (CMC) as a thickener, 1 part by mass of styrene butadiene rubber (SBR) as a binder, and tungsten oxide ($WO_3$) as a negative electrode additive in 0.1 mol % in terms of tungsten atoms in tungsten oxide relative to the carbon atoms in the graphite powder.

The battery thus fabricated will be written as the battery A7 hereinbelow.

(Experiment)

<Testing of Output Characteristics>

[Calculation of Capacity]

The batteries A1 to A7 and the battery Z1 fabricated as described above were each charged and discharged at a temperature of 25° C. under the following conditions, and the 1 It/0.2 It capacity ratio was determined using the equation (1) below. The results are described in Table 1.

(Charging and Discharging Conditions)

Initial Charging and Discharging Conditions

Charging and discharging were repeated under constant charging conditions while changing discharging conditions.

Charging and Discharging Conditions in 1st Cycle

The battery was charged at a constant current of 0.5 It (475 mA) until the battery voltage reached 4.2 V, and was further charged at a constant voltage of 4.2 V until the current value reached 0.02 It (19 mA). Subsequently, the battery was discharged at a constant current of 0.2 It (190 mA) to a battery voltage of 2.5 V.

Charging and Discharging Conditions in 2nd Cycle

The battery was charged under the same conditions as in the 1st cycle and was thereafter discharged at a constant current of 1 It (950 mA) to a battery voltage of 2.5 V.

(Equation for Calculating Output Characteristics)

1 It/0.2 It capacity ratio (%)=(Discharge capacity in 2nd cycle/Discharge capacity in 1st cycle)×100     (1)

TABLE 1

| Battery | Lithium transition metal oxide | Negative electrode active materials | Negative electrode additive | Amount of negative electrode additive (mol %) | 1 It/ 0.2 It capacity ratio (%) |
|---|---|---|---|---|---|
| Z1 | $LiNi_{0.82}Co_{0.15}Al_{0.03}O_2$ | Graphite | Nil | — | 92.8 |
| A1 | $LiNi_{0.82}Co_{0.15}Al_{0.03}O_2$ | Graphite | $WO_3$ | 0.05 | 93.4 |
| A2 | $LiNi_{0.82}Co_{0.15}Al_{0.03}O_2$ | Graphite | $WO_3$ | 0.1 | 94.3 |
| A3 | $LiNi_{0.82}Co_{0.15}Al_{0.03}O_2$ | Graphite | $WO_3$ | 0.5 | 97.2 |
| A4 | $LiNi_{0.82}Co_{0.15}Al_{0.03}O_2$ | Graphite | $WO_3$ | 1.0 | 94.0 |
| A5 | $LiNi_{0.82}Co_{0.15}Al_{0.03}O_2$ | Graphite | $Li_2WO_4$ | 0.01 | 93.6 |
| A6 | $LiNi_{0.82}Co_{0.15}Al_{0.03}O_2$ | Graphite | $Li_2WO_4$ | 0.05 | 95.0 |
| A7 | $LiNi_{0.82}Co_{0.15}Al_{0.03}O_2$ | Graphite + SiO | $WO_3$ | 0.1 | 97.0 |

As clear from Table 1, the batteries A1 to A7, in which the negative electrode contained the tungsten compound $WO_3$ or $Li_2WO_4$ and the tungsten compound was present near the surface of the negative electrode active material, attained an increase in 1 It/0.2 It capacity ratio and thus achieved enhanced output characteristics as compared to the battery Z1 which did not have any tungsten compound in the negative electrode. The reasons as to why these results were obtained are not clear but are probably as follows.

One of the possible reasons is that in the batteries A1 to A7, the reductive decomposition reaction of the nonaqueous electrolytic solution occurred first on the tungsten compound present near the surface of the negative electrode active material particles (carbon material particles) during the first charging, and the decomposition compounds resulting from this reaction formed a quality film with excellent lithium ion diffusibility on the surface of the carbon material particles. Because of this quality film, the diffusibility of lithium ions within the film was enhanced and lithium ions were smoothly exchanged between the negative electrode active material and the nonaqueous electrolytic solution during large-current charging and discharging, and consequently the increase in resistance was prevented. Another possible reason is that the early formation of the quality film on the surface of the negative electrode active material prevented the surface of the negative electrode active material from being excessively covered with a protective film with poor lithium ion diffusibility that was formed later by the reductive decomposition reaction occurring on the negative electrode active material, and this prevention also contributed to suppressing the increase in resistance. The enhancements in output characteristics are probably ascribed to these mechanisms.

The comparison among the batteries A1 to A4 which involved $WO_3$ as the negative electrode additive (the tungsten compound) shows that the 1 It/0.2 It capacity ratio was enhanced in the batteries A1 to A3 with increasing amount of the tungsten compound. The reason for this is probably because the tungsten compound added in an increased amount was incorporated in a larger amount into the negative electrode and consequently allowed a quality film to be effectively formed on the surface of the negative electrode active material by the decomposition of the electrolytic solution on the tungsten present near the surface of the negative electrode active material.

In the battery A4, however, the amount in which the tungsten compound was added was larger than in the battery A3 but the 1 It/0.2 It capacity ratio was decreased. The reason for this is probably because the amount of the tungsten compound included in the negative electrode was so large that the tungsten compound covered an increased area of the surface of the negative electrode active material to add a resistance in excess of the reduction in resistance by the formation of the quality film on the surface of the negative electrode active material.

From the foregoing, the quality film formed on the surface of the negative electrode active material by the decomposition reaction of the nonaqueous electrolytic solution on the tungsten compound has higher lithium ion diffusibility than the protective film formed on the surface of the negative electrode active material by the decomposition reaction of the nonaqueous electrolytic solution on the negative electrode active material; however, there is an optimum range of the amount in which the tungsten compound is added probably because the lithium ion diffusibility of the tungsten compound per se present on the negative electrode active material is not as good.

The comparison of the batteries A2 and A7 differing only in the negative electrode active materials shows that the battery A7, which involved a carbon material and a silicon compound as the negative electrode active materials, attained a higher 1 It/0.2 It capacity ratio than the battery A2 which involved a carbon material alone as the negative electrode active material. Based on this result, it is reasonably assumed that it is preferable to use both a carbon material and a silicon compound as the negative electrode active materials, rather than to use a carbon material alone, and the combined use provides a further enhancement in the output characteristics described hereinabove.

In the battery A7, the quality film with excellent lithium ion diffusibility was formed on the surface of the carbon material particles and also on the surface of the silicon compound particles. It is then probable that the formation of the film by the products of the reductive decomposition on the tungsten compound took place more effectively on the surface of the silicon compound particles than on the surface of the carbon material particles, and consequently the battery A7 achieved an enhancement in capacity ratio over the battery A2.

In the case of molybdenum belonging to the same group as tungsten in the periodic table, the reductive decomposition reaction of the nonaqueous electrolytic solution will occur first on the molybdenum compound and the resultant decomposition compounds will form a quality film with excellent lithium ion diffusibility on the surface of the negative electrode active material by the same mechanism as described above. As a result, the increase in resistance is prevented and output characteristics during large-current charging and discharging are enhanced.

Second Experimental Examples

Experimental Example 9

A nonaqueous electrolyte secondary battery was fabricated in the same manner as in EXPERIMENTAL EXAMPLE 1, except that the lithium transition metal oxide used in the preparation of the positive electrode mixture slurry was changed from the lithium nickel cobalt aluminum composite oxide $LiNi_{0.82}Co_{0.15}Al_{0.03}O_2$ in EXPERIMENTAL EXAMPLE 1 to lithium nickel cobalt aluminum composite oxide $LiNi_{0.91}Co_{0.06}Al_{0.03}O_2$.

The battery thus fabricated will be written as the battery A8 hereinbelow.

Experimental Example 10

A nonaqueous electrolyte secondary battery was fabricated in the same manner as in EXPERIMENTAL EXAMPLE 9, except that the tungsten oxide used in the preparation of the negative electrode mixture slurry in EXPERIMENTAL EXAMPLE 9 was not added.

The battery thus fabricated will be written as the battery Z2 hereinbelow.

The batteries A8 and Z2 fabricated as described above were each analyzed by the same method as described above to determine the 1 It/0.2 It capacity ratio. The results are described in Table 2 together with the results of the batteries Z1 and A2.

As clear from Table 2, the comparison of the batteries A8 and Z2 which involved the lithium transition metal oxide with a 91% Ni ratio shows that the battery A8, in which the negative electrode contained the tungsten compound $WO_3$ and the tungsten compound was present near the surface of the negative electrode active material, attained an increase in 1 It/0.2 It capacity ratio and thus achieved enhanced output characteristics as compared to the battery Z2 which did not have any tungsten compound in the negative electrode.

Third Experimental Examples

Experimental Example 11

[Preparation of Positive Electrode Mixture Slurry]

Lithium nickel cobalt aluminum composite oxide $LiNi_{0.82}Co_{0.15}Al_{0.03}O_2$ as a lithium transition metal oxide was mixed together with tungsten oxide ($WO_3$) and the mixture was heat treated at 200° C. to give a positive electrode active material in which the tungsten compound was present on the surface of the lithium nickel cobalt aluminum composite oxide.

Next, 100 parts by mass of the positive electrode active material obtained above was mixed together with 1 part by mass of carbon black as a carbon conductive agent and 0.9 parts by mass of polyvinylidene fluoride as a binder. Further, an appropriate amount of NMP (N-methyl-2-pyrrolidone) was added, thereby forming a positive electrode mixture slurry.

A nonaqueous electrolyte secondary battery was fabricated in the same manner as in EXPERIMENTAL EXAMPLE 2, except that the positive electrode mixture slurry prepared above was used.

The battery thus fabricated will be written as the battery A9 hereinbelow.

SEM observation of the positive electrode showed that the particles of the lithium nickel cobalt aluminum composite oxide as the lithium transition metal oxide were secondary particles with an average particle diameter of 11.8 μm which were aggregates of primary particles having an average particle diameter of 181 nm. The observation further confirmed that lithium tungsten oxide particles had been attached to the surface of both the primary particles and the secondary particles of the lithium nickel cobalt aluminum composite oxide.

The battery A9 fabricated as described above was analyzed by the same method as described above to determine the 1 It/0.2 It capacity ratio. The result is described in Table 3 together with the results of the batteries Z1 and A2.

TABLE 2

| Battery | Lithium transition metal oxide | Negative electrode active material | Negative electrode additive | Amount of negative electrode additive (mol %) | 1 It/ 0.2 It capacity ratio (%) |
|---|---|---|---|---|---|
| Z1 | $LiNi_{0.82}Co_{0.15}Al_{0.03}O_2$ | Graphite | Nil | — | 92.8 |
| A2 | $LiNi_{0.82}Co_{0.15}Al_{0.03}O_2$ | Graphite | $WO_3$ | 0.1 | 94.3 |
| Z2 | $LiNi_{0.91}Co_{0.06}Al_{0.03}O_2$ | Graphite | Nil | — | 93.3 |
| A8 | $LiNi_{0.91}Co_{0.06}Al_{0.03}O_2$ | Graphite | $WO_3$ | 0.1 | 94.2 |

TABLE 3

| Battery | Lithium transition metal oxide | Positive electrode additive | Negative electrode active material | Negative electrode additive | Amount of negative electrode additive (mol %) | 1 It/ 0.2 It capacity ratio (%) |
|---|---|---|---|---|---|---|
| Z1 | $LiNi_{0.82}Co_{0.15}Al_{0.03}O_2$ | Nil | Graphite | Nil | — | 92.8 |
| A2 | $LiNi_{0.82}Co_{0.15}Al_{0.03}O_2$ | Nil | Graphite | $WO_3$ | 0.1 | 94.3 |
| A9 | $LiNi_{0.82}Co_{0.15}Al_{0.03}O_2$ | $WO_3$ | Graphite | $WO_3$ | 0.1 | 95.9 |

As clear from Table 3, the battery A9, in which the tungsten compound was present on the surface of the lithium transition metal oxide, attained an increase in 1 It/0.2 It capacity ratio and thus achieved excellent output characteristics as compared to the battery A2 which did not have any tungsten compound on the surface of the lithium transition metal oxide.

Fourth Experimental Examples

Experimental Example 12

A nonaqueous electrolyte secondary battery was fabricated in the same manner as in EXPERIMENTAL EXAMPLE 4, except that the nonaqueous electrolytic solution was prepared by further adding fluoroethylene carbonate (FEC) to the nonaqueous electrolytic solution of EXPERIMENTAL EXAMPLE 1 in a ratio of 0.5 mass % relative to the mixed solvent.

The battery thus fabricated will be written as the battery A10 hereinbelow.

The battery A10 fabricated as described above was analyzed by the same method as described above to determine the 1 It/0.2 It capacity ratio. The result is described in Table 4 together with the results of the batteries Z1 and A3.

TABLE 4

| Battery | Lithium transition metal oxide | Negative electrode active material | Negative electrode additive | Amount of negative electrode additive (mol %) | Additive to electrolytic solution | 1 It/ 0.2 It capacity ratio (%) |
|---|---|---|---|---|---|---|
| Z1 | $LiNi_{0.82}Co_{0.15}Al_{0.03}O_2$ | Graphite | Nil | — | — | 92.8 |
| A3 | $LiNi_{0.82}Co_{0.15}Al_{0.03}O_2$ | Graphite | $WO_3$ | 0.5 | — | 97.2 |
| A10 | $LiNi_{0.82}Co_{0.15}Al_{0.03}O_2$ | Graphite | $WO_3$ | 0.5 | FEC | 97.7 |

As clear from Table 4, the battery A10, in which FEC had been added to the nonaqueous electrolytic solution, attained an increase in 1 It/0.2 It capacity ratio and thus achieved excellent output characteristics as compared to the battery A3 in which the nonaqueous electrolytic solution did not contain FEC.

The reason for this result is probably because FEC was more prone to reductive decomposition on the tungsten compound than the other components of the nonaqueous electrolytic solution and the products resulting from its reductive decomposition participated in the formation of a film on the negative electrode active material, making it possible to further reduce the formation of a protective film with poor lithium ion diffusibility by the reductive decomposition of the nonaqueous electrolytic solution on the negative electrode active material.

INDUSTRIAL APPLICABILITY

The positive electrodes for nonaqueous electrolyte secondary batteries according to one aspect of the present invention can be used in power supplies for driving of, for example, electric vehicles (EV), hybrid electric vehicles (HEV and PHEV) and electric tools, and in particular in such applications requiring a long life. Further, the batteries are expected to find use in mobile information terminals such as cellphones, laptop computers, smartphones and tablet terminals.

REFERENCE SIGNS LIST

10 NONAQUEOUS ELECTROLYTE SECONDARY BATTERY
11 LAMINATE EXTERIOR CASE
12 WOUND ELECTRODE ASSEMBLY
13 POSITIVE ELECTRODE
14 NEGATIVE ELECTRODE
14a NEGATIVE ELECTRODE CURRENT COLLECTOR
14b NEGATIVE ELECTRODE MIXTURE LAYER
14c NEGATIVE ELECTRODE ACTIVE MATERIAL
14d NEGATIVE ELECTRODE ACTIVE MATERIAL
15 SEPARATOR
16 POSITIVE ELECTRODE CURRENT COLLECTOR TAB
17 NEGATIVE ELECTRODE CURRENT COLLECTOR TAB
18 HEAT-SEALED PORTION
19 EXTENDED SPACE

The invention claimed is:
1. A nonaqueous electrolyte secondary battery comprising a positive electrode including a lithium transition metal oxide, a negative electrode including a negative electrode active material capable of storing and releasing lithium ions, and a nonaqueous electrolyte,
the negative electrode active material including a carbon material as a main component,
the negative electrode including a lithium tungsten composite oxide and/or a lithium molybdenum composite oxide.

2. The nonaqueous electrolyte secondary battery according to claim 1, wherein the lithium tungsten composite oxide and/or the lithium molybdenum composite oxide is attached to the surface of the carbon material.

3. The nonaqueous electrolyte secondary battery according to claim 1, wherein the content of the lithium tungsten composite oxide and/or the lithium molybdenum composite oxide is not less than 0.001 mol % and not more than 1 mol % relative to the total molar amount of the negative electrode active material.

4. The nonaqueous electrolyte secondary battery according to claim 1, wherein the negative electrode further includes a silicon compound as an additional negative electrode active material.

5. The nonaqueous electrolyte secondary battery according to claim 4, wherein the lithium tungsten composite oxide and/or the lithium molybdenum composite oxide is attached to the surface of the silicon compound.

6. The nonaqueous electrolyte secondary battery according to claim 4, wherein the silicon compound is a silicon oxide represented by SiOx (0.5≤x≤1.5).

7. The nonaqueous electrolyte secondary battery according to claim 1, wherein the lithium transition metal oxide is an oxide represented by the general formula $Li_aNi_xM_{1-x}O_2$ (0.95≤a≤1.2, 0.8≤x<1, and M is at least one or more elements selected from Co, Mn and Al).

8. The nonaqueous electrolyte secondary battery according to claim 7, wherein the lithium transition metal oxide is an oxide represented by the general formula $Li_aNi_xCo_yAl_zO_2$ (0.95≤a≤1.2, 0.8≤x<1, 0<y<0.2, 0<z≤0.05, and x+y+z=1).

9. The nonaqueous electrolyte secondary battery according to claim 1, wherein the lithium transition metal oxide is in the form of secondary particles formed by the aggregation of primary particles, and a tungsten compound and/or a molybdenum compound is present on the surface of at least either the primary particles or the secondary particles.

10. The nonaqueous electrolyte secondary battery according to claim 9, wherein the amount of the tungsten compound and/or the molybdenum compound is not less than 0.1 mol % and not more than 1.5 mol % relative to the lithium transition metal oxide.

11. The nonaqueous electrolyte secondary battery according to claim 1, wherein the nonaqueous electrolyte includes fluoroethylene carbonate.

12. The nonaqueous electrolyte secondary battery according to claim 11, wherein the content of the fluoroethylene carbonate is not less than 0.5 mass % and not more than 5 mass % relative to the nonaqueous electrolyte.

13. The nonaqueous electrolyte secondary battery according to claim 1, wherein the lithium tungsten composite oxide and/or the lithium molybdenum composite oxide comprises $Li_2WO_4$.

14. The nonaqueous electrolyte secondary battery according to claim 1, wherein the lithium tungsten composite oxide and/or the lithium molybdenum composite oxide comprises $Li_2MoO_4$.

* * * * *